United States Patent
Hsu

(10) Patent No.: US 7,526,146 B1
(45) Date of Patent: Apr. 28, 2009

(54) ELECTRO-OPTICAL MODULATOR AND A METHOD FOR MANUFACTURING THE SAME

(75) Inventor: Shih-Hsiang Hsu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 0 days.

(21) Appl. No.: 12/192,139

(22) Filed: Aug. 15, 2008

(30) Foreign Application Priority Data

May 15, 2008 (TW) .............................. 97117903 A

(51) Int. Cl.
 *G02F 1/035* (2006.01)
 *H01L 21/00* (2006.01)

(52) U.S. Cl. .................. 385/2; 385/1; 385/14; 385/130; 385/131; 438/29; 438/31

(58) Field of Classification Search ...................... 385/1, 385/2, 3, 7, 8, 9, 10, 11, 14, 39.4, 42, 129, 385/130, 131, 132; 438/29, 31
See application file for complete search history.

(56) References Cited

U.S. PATENT DOCUMENTS

| | | | | |
|---|---|---|---|---|
| 5,908,305 | A * | 6/1999 | Crampton et al. | 438/141 |
| 6,181,456 | B1 * | 1/2001 | McBrien et al. | 359/245 |
| 6,834,152 | B2 * | 12/2004 | Gunn et al. | 385/130 |
| 6,917,727 | B2 * | 7/2005 | Gunn et al. | 385/14 |
| 6,990,257 | B2 * | 1/2006 | Gunn et al. | 385/2 |
| 7,127,147 | B2 * | 10/2006 | Gunn et al. | 385/130 |
| 2003/0059190 | A1 * | 3/2003 | Gunn et al. | 385/130 |
| 2005/0123227 | A1 * | 6/2005 | Vonsovici et al. | 385/2 |

OTHER PUBLICATIONS

Authored by Liu, et al., article titled "High-speed optical modulation based on carrier depletion in a silicon waveguide", adopted from Optics Express, Jan. 22, 2007, vol. 15, No. 2, paged 660-668.

* cited by examiner

*Primary Examiner*—Brian M Healy
(74) *Attorney, Agent, or Firm*—Jianq Chyun IP Office

(57) ABSTRACT

An electro-optical modulator is provided. The electro-optical modulator has a substrate. A first insulator layer, an optical waveguide, a first doped semiconductor layer, a second insulator layer, a second doped semiconductor layer, and a third insulator layer are sequentially disposed over the substrate. The optical waveguide is adapted for transmitting a light wave. The optical waveguide includes a first semiconductor layer, a second semiconductor layer, and a third semiconductor layer. The first semiconductor layer is disposed on the first insulator layer. The first doped semiconductor layer is disposed on the first insulator layer, and positioned at two opposite sides of the optical waveguide for electrically connecting the optical waveguide. The second insulator layer is disposed on the substrate for covering the first doped semiconductor layer. The second doped semiconductor layer is disposed on the second insulator layer and electrically connected to the third semiconductor layer.

22 Claims, 5 Drawing Sheets

ELECTRO-OPTICAL MODULATOR AND A METHOD FOR MANUFACTURING THE SAME

CROSS-REFERENCE TO RELATED APPLICATION

This application claims the priority benefit of Taiwan application serial no. 97117903, filed on May 15, 2008. The entirety of the above-mentioned patent application is hereby incorporated by reference herein and made a part of specification.

BACKGROUND OF THE INVENTION

1. Field of the Invention

The present invention generally relates to modulators, and more particularly, to an electro-optical modulator.

2. Description of Related Art

Presently, the optoelectronic technology employs substrates made of different semiconductor materials in producing integrated optoelectronic components for light emitting, light modulation, light detection, or light guiding. For example, a typical silicon material is featured with a relative low loss in light transmittance. For this reason, related research with respect to silicon material concerns more about applications of optical features thereof, for example an optical waveguide component.

Further, a silicon-on-insulator (SOI) component is configured by depositing a layer of monocrystalline silicon having a thickness of 0.2 to 100 microns on a silicon substrate, and a dielectric layer having a thickness of 0.25 to 3 microns is disposed between the substrate and monocrystalline silicon for isolating electric effect so as to reduce the power consumption, and decreasing current loss and injunction resistance so as to accelerate a processing speed of the IC. In other words, the SOI component is adapted for manufacturing products requiring for lower power consumption. As such, SOI components are often employed in equipment for lower power consumption, such as cellular phones, or watches. In order to more effectively exert the advantage of high speed operation, the SOI components are more often employed in low power portable communication devices, smart power switches, wideband local network broadcasting networks, micro-optoelectronic components for optical signal processing, and micro electromechanical components.

Presently, an optoelectronic component made of silicon material usually achieves a high speed modulation by free carrier plasma dispersion effect. According to the free carrier plasma dispersion effect, a refractive index of the material is changed by implanting carriers therein, and a structure of Mach-Zehnder interferometer configured by the material is adapted for a mechanism of high speed modulation.

In optical communication system, data are usually inputted into optical fibers via an electro-optical modulator. However, because of the ultra bandwidth of the optical fiber, and the demultiplexing function for the operating wavelength and frequency, presently using 10 Gb/s electro-optical modulators doesn't satisfy the requirement of application. In order to satisfy the coming OC768 optical communication broadcasting, a modulation speed greater than 30 GHz is critical and very much desirable. Most of the effective semiconductor electro-optical modulators are designed with the operation principle according to the free carrier plasma dispersion effect. Specifically, a modulation structure of a forward bias PIN diode or a modulation structure of a metal oxide semiconductor (MOS) capacitor can achieve a frequency bandwidth of 2 GHz only. A modulation structure of a reverse biased PN junction can achieve a modulation speed frequency band of 20 GHz at most. Accordingly, for achieving a faster data transmission speed, an electro-optical modulator having a faster modulation speed and a lower power consumption is desired for expediting the development and application of the enterprise.

SUMMARY OF THE INVENTION

Accordingly, the present invention is directed to an electro-optical modulator with the refractive index change of the waveguide material in a Mach-Zehnder interferometer, for a better modulation speed.

The present invention is also directed to a method for manufacturing an electro-optical modulator to achieve a higher modulation speed.

The present invention provides an electro-optical modulator, which includes a substrate, a first insulator layer, an optical waveguide, a first doped semiconductor layer, a second insulator layer, a second doped semiconductor layer, and a third insulator layer. The first insulator layer is disposed on the substrate. The optical waveguide is disposed on the first insulator layer, and is adapted for transmitting a light wave. The optical waveguide includes a first semiconductor layer, a second semiconductor layer, and a third semiconductor layer. The first semiconductor layer is disposed on the first insulator layer. The second semiconductor layer is disposed on the first semiconductor layer, and the third semiconductor layer is disposed on the second semiconductor layer. The first doped semiconductor layer is disposed on the first insulator layer, and positioned at two opposite sides of the optical waveguide for electrically connecting the optical waveguide. The second insulator layer is disposed on the substrate for covering the first doped semiconductor layer. The second doped semiconductor layer is disposed on the second insulator layer, and positioned at one side of the third semiconductor layer for electrically connecting the third semiconductor layer. The third insulator layer is disposed on the substrate for covering the second insulator layer, the optical waveguide, and the second doped semiconductor layer, wherein the second insulator layer and the third insulator layer have a plurality of contact windows for exposing the first doped semiconductor layer, and the second doped semiconductor layer.

According to an embodiment of the present invention, the first semiconductor layer is made of a lightly doped positive type (or named as P$^-$-type) semiconductor material.

According to an embodiment of the present invention, the second semiconductor layer is made of an intrinsic semiconductor material.

According to an embodiment of the present invention, the third semiconductor layer is made of a lightly negative type (or named as N$^-$-type) semiconductor material.

According to an embodiment of the present invention, the first doped semiconductor layer is a heavily doped positive type (or named as P$^+$-type) semiconductor material.

According to an embodiment of the present invention, the second doped semiconductor layer is made of a heavily doped negative type (or named as N$^+$-type) semiconductor material.

According to an embodiment of the present invention, the second doped semiconductor layer includes a lightly doped region and a heavily doped region.

According to an embodiment of the present invention, the lightly doped region and the heavily doped region are made of negative type semiconductor material, and the lightly doped region is electrically connected to the third semiconductor layer.

According to an embodiment of the present invention, the optical waveguide has a first thickness and a first width, and the second semiconductor layer has a second thickness, in which the second thickness is smaller than the first thickness.

According to an embodiment of the present invention, the first thickness and the first width are substantially between 0.34 µm to 0.52 µm, for satisfying the demand of a module adapted for both a transverse TE-like single mode and a transverse TM-like single mode.

According to an embodiment of the present invention, the second thickness is substantially between 0.13 µm to 0.23 µm for achieving a modulation speed greater than 20 GHz.

According to an embodiment of the present invention, the electro-optical modulator further includes a first electrode and a second electrode. The first electrode is disposed on the third insulator layer. The first electrode includes a plurality of first contact conductors positioned in the contact windows. The first electrode is electrically connected to the first doped semiconductor layer via the first contact conductors. The second electrode is disposed on the third insulator layer. The second electrode includes a plurality of second contact conductors positioned in the contact windows. The second electrode is electrically connected to the second doped semiconductor layer via the second contact conductors.

The present invention further provides a method for manufacturing an electro-optical modulator including the following steps. First, a first insulator layer is formed on a substrate. Next, an optical waveguide is formed on the first insulator layer, wherein the optical waveguide includes a first semiconductor layer, a second semiconductor layer, and a third semiconductor layer. Next, a first doped semiconductor layer is formed on the first insulator layer at two opposite sides of the optical waveguide for electrically connecting the optical waveguide. Next, a second insulator layer is formed on the substrate for covering the first doped semiconductor layer. Next, a second doped semiconductor layer, formed on the second insulator layer, is positioned at one side of the third semiconductor layer for electrically connecting the third semiconductor layer. Next, a third insulator layer is formed on the substrate for covering the second insulator layer, the optical waveguide, and the second doped semiconductor layer, wherein the second insulator layer and the third insulator layer include a plurality of contact windows for exposing the first doped semiconductor layer, and the second doped semiconductor layer.

According to an embodiment of the present invention, a method of forming the optical waveguide further includes the following steps. First, forming the optical waveguide, made of a material of the second semiconductor layer, on the first insulating layer. Then, performing an ion doping process to the optical waveguide so as to form the first semiconductor layer and the third semiconductor layer respectively.

According to an embodiment of the present invention, a method of forming the first doped semiconductor layer includes the following steps. First, a semiconductor material layer is formed at two opposite sides of the optical waveguide on the first insulator layer. Then, performing an ion doping process to the semiconductor material layer so as to form the first doped semiconductor layer.

According to an embodiment of the present invention, the method for manufacturing an electro-optical modulator further includes the following step. A first electrode, comprising a plurality of first contact conductors positioned in the contact window, is formed on the third insulator layer. The first electrode is electrically connected to the first doped semiconductor via the first contact conductors.

According to an embodiment of the present invention, the method for manufacturing an electro-optical modulator further includes the following step. A second electrode, comprising a plurality of second contact conductors positioned in the contact windows, is formed on the third insulator layer. The second electrode is electrically connected to the second doped semiconductor layer via the second contact conductors.

According to an electro-optical modulator of an embodiment of the present invention, because the second semiconductor layer of the optical waveguide is an intrinsic semiconductor, and the first semiconductor layer is a positive type semiconductor layer, while the third semiconductor layer is a negative type semiconductor layer, the optical waveguide is configured with a P-intrinsic-N (PIN) structure. As such, when a reverse bias is applied to the electro-optical modulator, a depletion region will directly affect a frequency response of the electro-optical modulator, by which the frequency response condition of the electro-optical modulator can be simplified. In other words, because the second semiconductor layer of the optical waveguide in the electro-optical modulator is an intrinsic semiconductor, the applied reverse bias can be decreased and a width of the depletion region of the optical waveguide can be increased so that the capacitance of the optical waveguide is decreased accordingly, and thus accelerating the frequency response when driving the electro-optical modulator.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
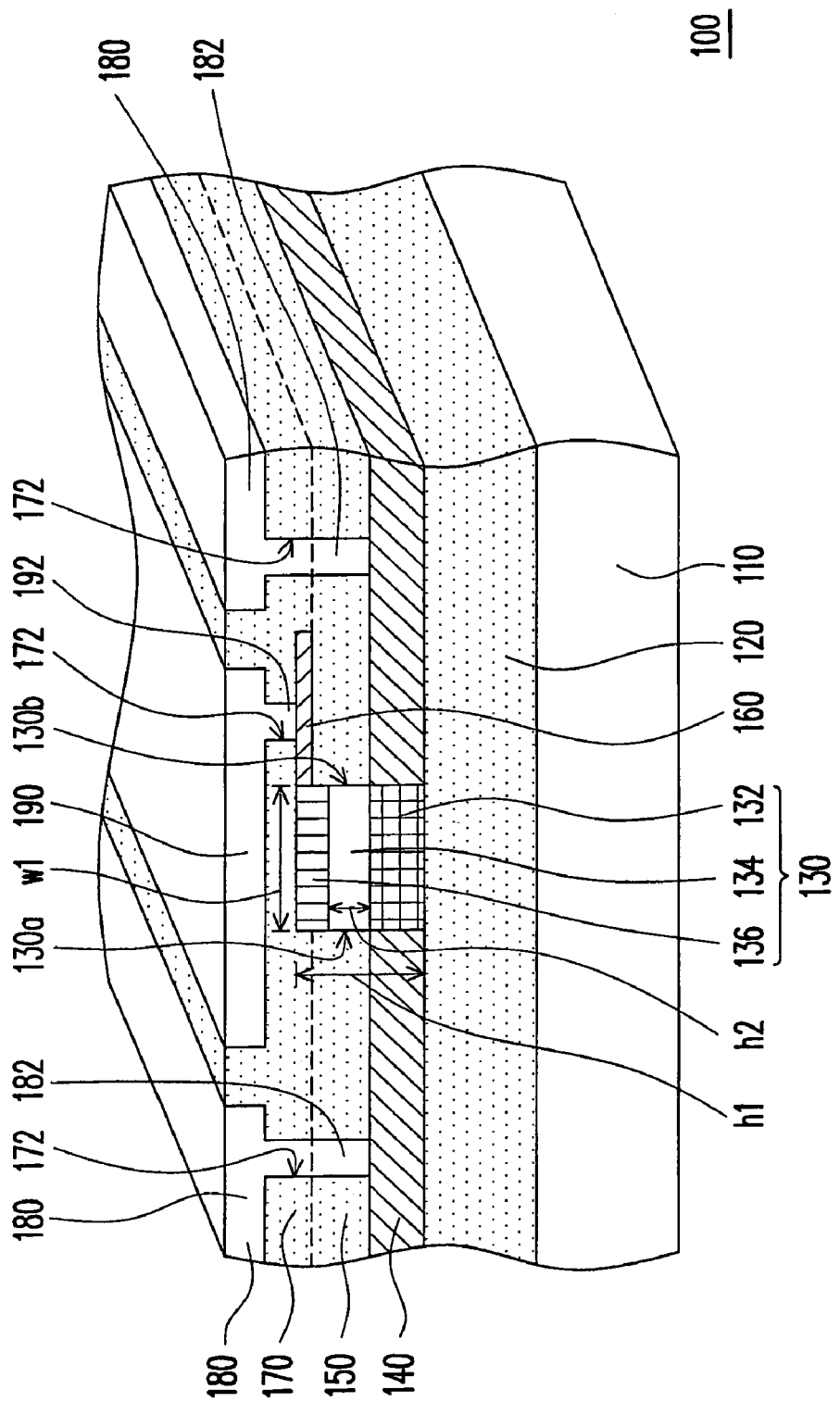
FIG. 1 is a cross-sectional view of an electro-optical modulator according to an embodiment of the present invention.

Reference will now be made in detail to the present preferred embodiments of the invention, examples of which are illustrated in the accompanying drawings. Wherever possible, the same reference counting numbers are used in the drawings and the description to refer to the same or like parts.

FIG. 1 is a cross-sectional view of an electro-optical modulator according to an embodiment of the present invention. Referring to FIG. 1, it illustrates an electro-optical modulator 100 including a substrate 110, a first insulator layer 120, an optical waveguide 130, a first doped semiconductor layer 140, a second insulator layer 150, a second dopedsemiconductor layer 160, and a third insulator layer 170. The first insulator layer 120 is disposed on the substrate 110. The optical waveguide 130 is disposed on the first insulator layer 120. The first doped semiconductor layer 140 is disposed on the first insulator layer 120, and positioned at two opposite sides 130a, 130b of the optical waveguide 130 for electrically connecting the optical waveguide 130. The second insulator layer 150 is disposed on the substrate 110 for covering the first doped semiconductor layer 140. The second doped semiconductor layer 160 is disposed on the second insulator layer 150. The third insulator layer 170 is disposed on the substrate 110 for covering the second insulator layer 150, the optical waveguide 130 and the second doped semiconductor layer 160.

In the present embodiment, the substrate 110 is preferably but not restricted to be a silicon substrate. The silicon substrate can be but not restricted to be a monocrystalline silicon substrate or a polycrystalline silicon substrate. For example, in other embodiments, the substrate 110 can also be made of other suitable semiconductor materials. The substrate 110 is provided to serve as a base of the electro-optical modulator, and is exemplified with but not restricted to be a silicon substrate.

In the present embodiment, the first insulator layer 120 can be made of materials including inorganic materials (such as silicon oxide, silicon nitride, silicon oxynitride, silicon carbide, hafnium oxide, aluminium oxide, or other suitable materials, or combination of the foregoing), organic materials (such as photo resist material, benzocyclobutene, cycloalkene, polysulfide imine, polysulfide amine, polyester, polyol, polyethylene oxide, polybenzo, resin, polyethers, polyketone, or other suitable materials, or combination of the foregoing). In the present embodiment of the present invention, the first insulator layer 120 is exemplified but not restricted to be made of a silicon dioxide material.

In the present embodiment, the optical waveguide 130 includes a first semiconductor layer 132, a second semiconductor layer 134, and a third semiconductor layer 136. The first semiconductor layer 132 is disposed on the first insulator layer 120. The second semiconductor layer 134 is disposed on the first semiconductor layer 132. The third semiconductor layer 136 is disposed on the second semiconductor layer 134. In detail, the first semiconductor layer 132 can be made of a lightly doped positive type semiconductor material, such as a lightly doped silicon material (p$^-$-Si). The second semiconductor layer 134 can be made of an intrinsic semiconductor material, such as an intrinsic silicon material (i-Si). The third semiconductor layer 136 can be made of a lightly doped negative type semiconductor material, such as a lightly doped silicon material (n$^-$-Si).

Further, the optical waveguide 130 is adapted for transmitting a light wave (not shown) having a wavelength between 1500 nm to 1610 nm. In the present embodiment, the optical waveguide 130 has a first thickness h1 and a first width w1, and the second semiconductor layer 134 has a second thickness h2. The second thickness h2 is smaller than the first thickness h1. In the present embodiment, the first thickness h1 and the first width w1 are substantially between 0.34 μm to 0.52 μm, and the second thickness h2 is between 0.13 μm to 0.23 μm. It should be noted, in the present embodiment, it is preferred but not restricted that the both of the first thickness h1 and the first width w1 are 0.52 μm. In other words, these two parties have an equivalent size. In other embodiments, the first thickness h1 and the first width w1 can be designed with other sizes.

In detail, according to an embodiment of the present invention, in order to satisfy the demand of a module adapted for a transverse TE-like single mode and a transverse TM-like single mode, avoid affections by multimode, and further consider the wavelength range from 1528 nm to 1605 nm defined by the International Telecommunication Union (ITU), it is preferred to select 0.52 μm as the first thickness h1 of the optical waveguide 130 so as for achieving an optimal birefringence effect, and manufacture the electro-optical modulator 100 with such an optical waveguide 130. Further, the first semiconductor layer 132 for example is made of a lightly doped silicon material (p$^-$-Si). The second semiconductor layer 134 for example is made of an intrinsic silicon material (i-Si). The third semiconductor layer 136 for example is made of a lightly doped silicon material (n$^-$-Si). As such, the optical waveguide 130 is configured with a PIN structure, in which the first width h1, and the first thickness w1 of the optical waveguide 130 of the PIN structure are all 0.52 μm for example.

In other words, when a reverse bias is applied to the optical waveguide 130, a width of PN depletion region can be obtained. Because the second semiconductor layer 134 is made of an intrinsic silicon material, a 4V reverse bias can be used for obtaining a maximum width of the depletion region, 0.52 μm. Further, in such a way, an equivalent capacitance of the optical waveguide 130 achieves the minimum, and the frequency response will be faster.

The equations defining a built-in potential and capacitance are as follows:

$$V_{bi} = \frac{kT}{q} \ln \frac{N_A N_D}{n_i^2}$$

$$c = \frac{C}{A} = \frac{1}{\sqrt{\left(\frac{x_3 - x_2}{\in}\right)^2 + \frac{2}{\in q}\left(\frac{1}{N_D} + \frac{1}{N_A}\right)(V_{bi} + V_R)}},$$

in which $V_{bi}$ represents a built-in potential; k represents the Boltzmann constant=1.38×10$^{-23}$ J/K; T represents the temperature in Kelvin temperature scale=° C.+273; q=1.6×10$^{-19}$ Coulomps; $N_A$ represents a receptor (acceptor) dopant density cm$^{-3}$; $N_D$ represents a donor dopant density cm$^{-3}$; $n_i$ represents a carrier intensity=9.65×109 cm$^{-3}$; c represents a unit-area capacitance; C represents the capacitance; A represents a cross-section area of the PIN structure; $x_3$-$x_2$ represents the thickness of the second semiconductor layer; $\in$ represents a permittivity, and $V_R$ represents the applied reverse bias.

It can be learnt from the above equations that the optical waveguide 130 is equipped with the second semiconductor layer 134, so that the optical waveguide 130 has a smaller capacitance. As such, when a reverse bias is applied, the optical waveguide 130 executes a faster frequency response, even up to 33 GHz.

It should be mentioned that a product constant of the resistance and the capacitance, and a drifting speed of electric holes are two most critical factors affecting the response speed. Supposing that the reverse bias is 10V, the width of the depletion region is 0.52 μm, and a mobility of the silicon electric holes is 500 cm$^2$/V-s, then the electric holes spend a time in the depletion region as: the time for the electric holes to travel in the depletion region is as follows:

$$\frac{0.52 \times 10^{-6}}{\frac{10}{0.52 \times 10^{-6}} \times 500 \times 10^{-4}} = \frac{(0.52)^2 \times 10^{-12}}{5000 \times 10^{-4}} = 5.4 \times 10^{-13} s = 0.54 \text{ps}.$$

It can be learnt from the foregoing calculation that the above assumption is equivalent to a frequency bandwidth of 1000 GHz. As it is well known that silicon electric holes have a faster mobility, 1450 cm$^2$/V-s, the response speed of the electro-optical modulator is mainly affected by the capacitance rather than the drifting speed of the electrons or electric holes. In other words, the electro-optical modulator is configured with a second semiconductor layer in the optical waveguide, so that the optical waveguide has a PIN structure, by which the capacitance of the optical waveguide can be reduced. In such a way, when a reverse bias is applied, the frequency response of the optical waveguide is faster.

In the embodiment, the first doped semiconductor layer 140 can be made of a heavily doped positive type semiconductor material, such as a heavily doped positive type silicon material ($p^+$-Si). The second doped semiconductor layer 160 can be made of a heavily doped negative semiconductor layer, such as a heavily doped negative type silicon material ($n^+$-Si). Further, in another embodiment, not shown in the drawings, the second doped semiconductor layer 160 may include a lightly doped region (not shown), and a heavily doped region (not shown). The lightly doped region and the heavily doped region are negative semiconductors. The lightly doped region is electrically connected to the third semiconductor layer. The semiconductor materials used above can be amorphous silicon, monocrystalline silicon, microcrystalline silicon, or germanium silicide having foregoing crystalline structures, or other suitable materials, or combination of the foregoing, according to requirement of design and application. The present invention is exemplified with but not restricted by a monocrystalline silicon material.

In the present embodiment, the second insulator layer 150 and the third insulator layer 170 include a plurality of contact windows 172 for exposing the first doped semiconductor layer 140 and the second doped semiconductor layer 160, as shown in FIG. 1. Specifically, in the present embodiment, the second insulator layer 150 and the third insulator layer 170 can be made of a same insulator material, for example one of the materials disclosed when describing the first insulator layer 120. The present embodiment is exemplified with but not restricted to be a silicon dioxide material. Other materials may also be applied.

In the present embodiment, the electro-optical modulator 100 further includes a first electrode 180, and a second electrode 190. The first electrode 180 is disposed on the third insulator layer 170. The first electrode 180 includes a plurality of first contact conductors 182. The first electrode 180 is electrically connected to the first doped semiconductor layer 140 via the first contact conductors 182. The second electrode 190 is disposed on the third insulator layer 170. The second electrode 190 includes a plurality of second contact conductors 192. The second electrode 190 is electrically connected to the second doped semiconductor layer 160 via the second contact conductor 192. In the present embodiment, the first electrode 180 and the second electrode 190 can be configured with a single layer or a multilayer structure, and can be made of a metal material such as gold, silver, copper, tin, lead, hafnium, tungsten, molybdenum, neodymium, titanium, tantalum, aluminum, zinc, or alloy of the foregoing, or metal oxide of the foregoing, or nitride of the foregoing, or combination of the foregoing.

Figure 2A:
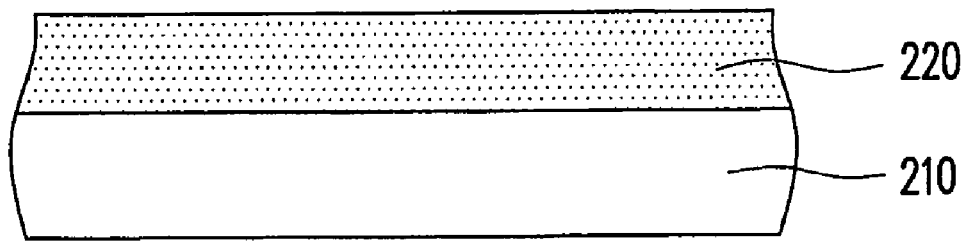
FIGS. 2A through 2H are schematic diagrams illustrating a manufacturing flow of the electro-optical modulator of the present invention.

FIGS. 2A through 2H are schematic diagrams illustrating a manufacturing flow of the electro-optical modulator of the present invention. First, referring to FIG. 2A, a first insulator layer 220 is formed on a substrate 210. The substrate 210 for example is can be a silicon substrate. The first insulator layer 220 for example can be but not restricted to be formed by a chemical vapour deposition (CVD) method, as shown in FIG. 2A. Other methods, such as screen printing, spin coating, ink jet printing, or power source processing, may also be applied in forming the first insulator layer 220 in other embodiments. The first insulator layer 220, configured with a single layer or a multilayer structure, for example can be made of an inorganic material (such as silicon oxide, silicon nitride, silicon oxynitride, silicon carbide, hafnium oxide, aluminium oxide, or other suitable materials, or combination of the foregoing), organic materials (such as photo resist material, benzocyclobutene, cycloalkene, polysulfide imine, polysulfide amine, polyester, polyol, polyethylene oxide, polybenzo, resin, polyethers, polyketone, or other suitable materials, or combination of the foregoing). In the present embodiment of the present invention, the first insulator layer 220 is exemplified to be but not restricted to be made of a silicon dioxide material.

Figure 2B:
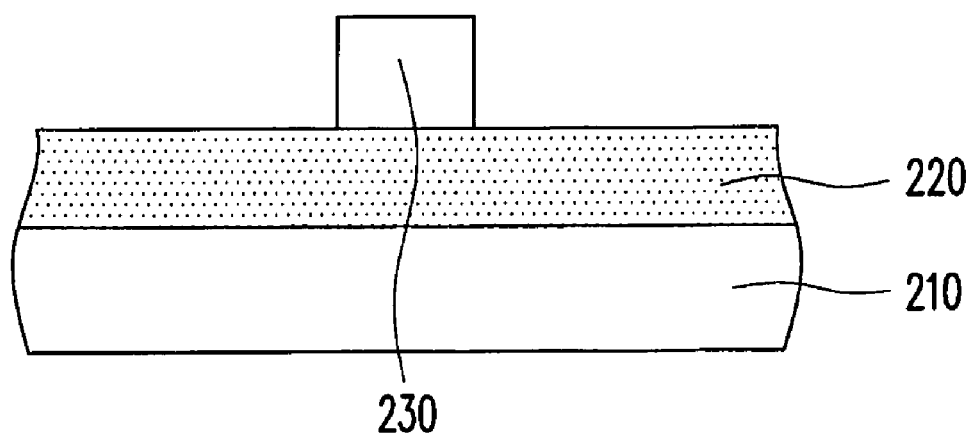
Figure 2C:
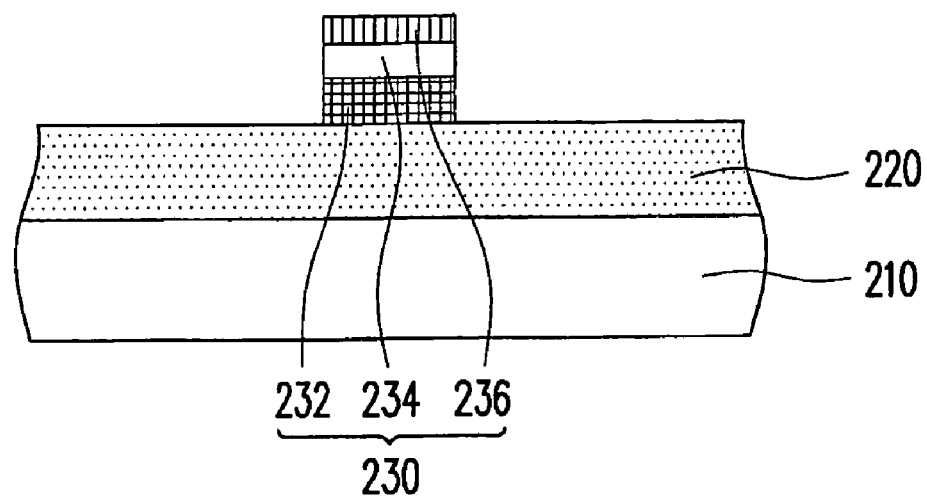

Next, referring to FIGS. 2B and 2C together, the optical waveguide 230, formed on the first insulator layer 220, includes a first semiconductor layer 232, a second semiconductor layer 234, and a third semiconductor layer 236. The method of forming the optical waveguide 230 further includes the following steps. First, an optical waveguide 230, being made of a material of the second semiconductor layer 234 as shown in FIG. 2B, is formed on the first insulator layer 220. According to the present embodiment, the material of the second semiconductor layer 234 is an intrinsic semiconductor material, for example an intrinsic silicon material. Specifically, the optical waveguide can be but not restricted to be formed by entirely forming a semiconductor material layer (not shown) on the first insulator layer 220, and then patterning the semiconductor material layer by a photolithography and etching processing to obtain the optical waveguide 230 as shown in FIG. 2B. Other methods, such as screen printing, spin coating, ink jet printing, power source processing, may also be applied in forming the optical waveguide 230 in other embodiments. The optical waveguide 230 can be made of amorphous silicon, monocrystalline silicon, microcrystalline silicon, or germanium silicide having foregoing crystalline structures, or other suitable materials, or combination of the foregoing, according to requirement of design and application. The present invention is exemplified with but not restricted by a monocrystalline silicon material.

Then, an ion implantation process is conducted to the optical waveguide 230 to form the first semiconductor layer 232 and the third semiconductor layer 236, as shown in FIG. 2C. In the present embodiment, the first semiconductor layer 232 is made of a positive type semiconductor material, such as a positive type silicon material. The third semiconductor layer 236 is made of an negative type semiconductor material, such as an negative type silicon material. The first semiconductor layer 232 and the third semiconductor layer 236 for example can be but not restricted to be made by an ion implantation method. However, the method of forming the first semiconductor layer 232 and the third semiconductor layer 236 is not restricted by the present invention.

Figure 2D:
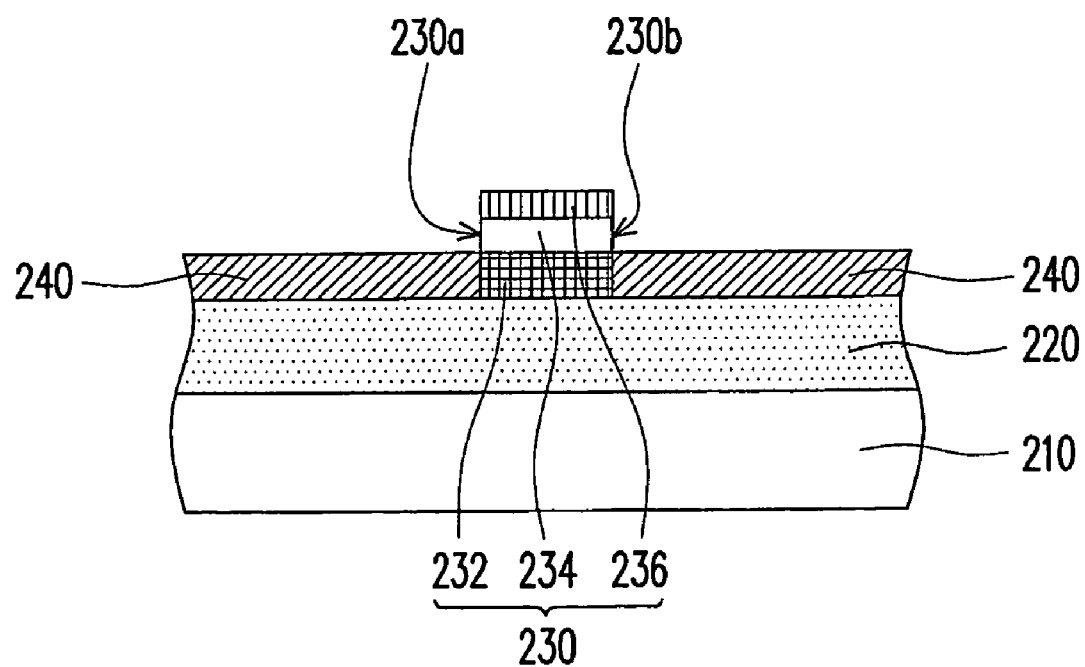

Next, referring to FIG. 2D, a first doped semiconductor layer 240 is formed on the first insulator layer 220, at two opposite sides 230a and 230b of the optical waveguide 230. The first doped semiconductor layer 240 is electrically connected to the optical waveguide 230. The method for forming the first doped semiconductor layer 240 includes the following steps. First, a patterned semiconductor material layer is provided on the first insulator layer 220 at the two opposite sides 230a and 230b of the optical waveguide 230. Next, an ion doping process is performed to the patterned semiconductor material layer to obtain the first doped semiconductor layer 240. The method for doping ions, for example, is an ion implantation processing. The first doped semiconductor layer 240 is made of a heavily doped positive type semiconductor material, such as a positive type silicon material.

Figure 2E:
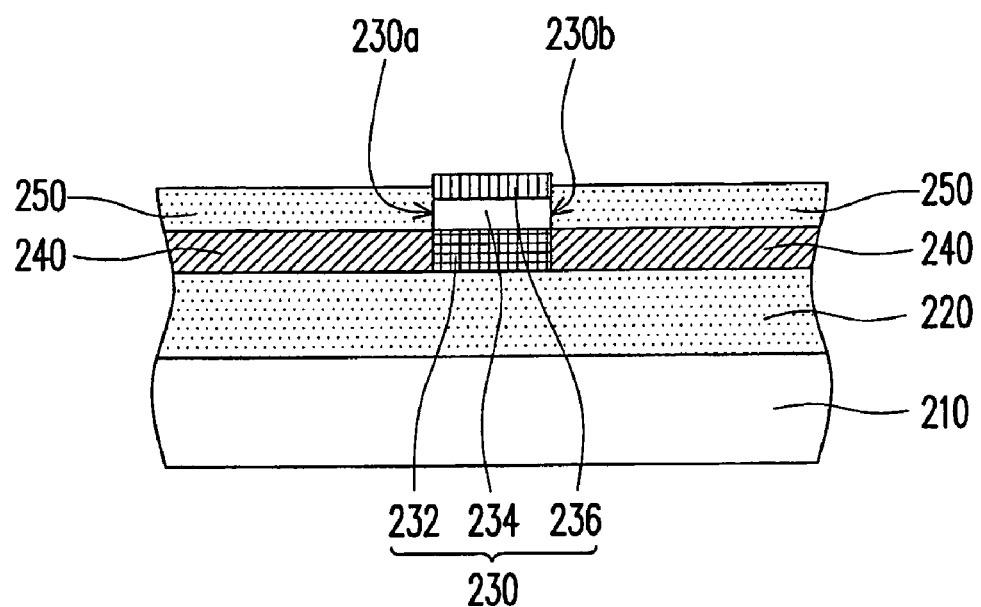

Further, referring to FIG. 2E, a second insulator layer 250 is formed on the substrate 210, for covering the first doped semiconductor layer 240. The second insulator layer 250, for example, can be but not restricted to be formed by a CVD method. Other methods, such as screen printing, spin coating, ink jet printing, power source processing, may also be applied in forming the second insulator layer 250 in other embodiments. The second insulator layer 250 can be configured with a single layer or a multilayer structure. The second insulator layer 250, for example, can be made of an inorganic material (such as silicon oxide, silicon nitride, silicon oxynitride, silicon carbide, hafnium oxide, aluminium oxide, or other suitable materials, or combination of the foregoing), organic materials (such as photo resist material, benzocyclobutene, cycloalkene, polysulfide imine, polysulfide amine, polyester, polyol, polyethylene oxide, polybenzo, resin, polyethers, polyketone, or other suitable materials, or combination of the foregoing). In the present embodiment of the present invention, the second insulator layer 250 is exemplified to be but not restricted to be made of a silicon dioxide material.

Figure 2F:
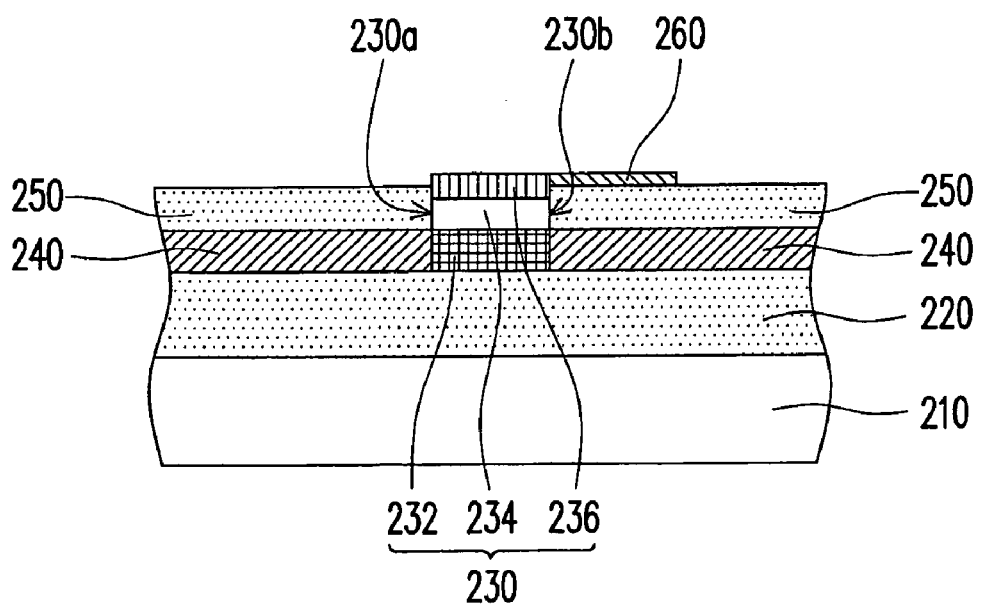

Next, referring to FIG. 2F, a second doped semiconductor layer 260 is formed on the second insulator layer 250. The second doped semiconductor layer 260 is positioned at one side 230b of the third semiconductor layer 236 for electrically connecting the third semiconductor layer 236, as shown in FIG. 2F. Specifically, a patterning semiconductor material layer (not shown) is formed on the second insulator layer 250. Then, an ion doping process is performed to the patterning semiconductor material layer to form the second doped semiconductor layer 260. The method for doping ions for example is an ion implantation processing. The second doped semiconductor layer 260 is made of a heavily doped negative type semiconductor material, such as an negative type silicon material. In other embodiments which are not shown in the drawings, the second doped semiconductor layer may further includes a lightly doped region (not shown), and a heavily doped region (not shown). The lightly doped region and the heavily doped region are made of an negative type semiconductor material, and the lightly doped region is electrically connected with the third semiconductor layer.

Figure 2G:
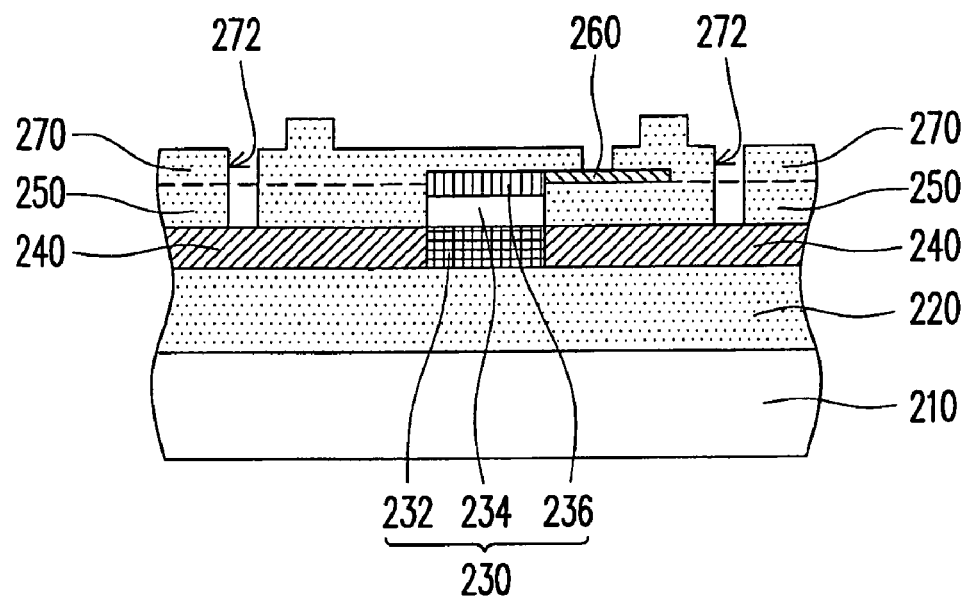

Next, referring to FIG. 2G, a third semiconductor layer 270 is formed on the substrate 210 for covering the second insulator layer 250, the optical waveguide 230, and the second doped semiconductor layer 260. The second insulator layer 250 and the third insulator layer 270 include a plurality of contact windows 272 for exposing the first doped semiconductor layer 240, and the second doped semiconductor layer 260, as shown in FIG. 2G. The third insulator layer 270 for example can be but not restricted to be formed by a CVD method. Other methods, such as screen printing, spin coating, ink jet printing, power source processing, may also be applied in forming the third insulator layer 270 in other embodiments. The third insulator layer 270 can be configured with a single layer or a multilayer structure. The third insulator layer 270, for example, can be made of an inorganic material (such as silicon oxide, silicon nitride, silicon oxynitride, silicon carbide, hafnium oxide, aluminium oxide, or other suitable materials, or combination of the foregoing), organic materials (such as photo resist material, benzocyclobutene, cycloalkene, polysulfide imine, polysulfide amine, polyester, polyol, polyethylene oxide, polybenzo, resin, polyethers, polyketone, or other suitable materials, or combination of the foregoing). In the present embodiment of the present invention, the third insulator layer 270 is exemplified to be but not restricted to be made of a silicon dioxide material. It should be noted that the contact windows 272, for example, are formed by etching the second insulator layer 250 and the third insulator layer 270 after the third insulator layer 270 to fulfill the fabrication of the contact windows 272. However, this method of forming the contact windows 272 is not restricted by the present invention. In other embodiments, other methods can be employed for forming the contact windows 272.

Figure 2H:
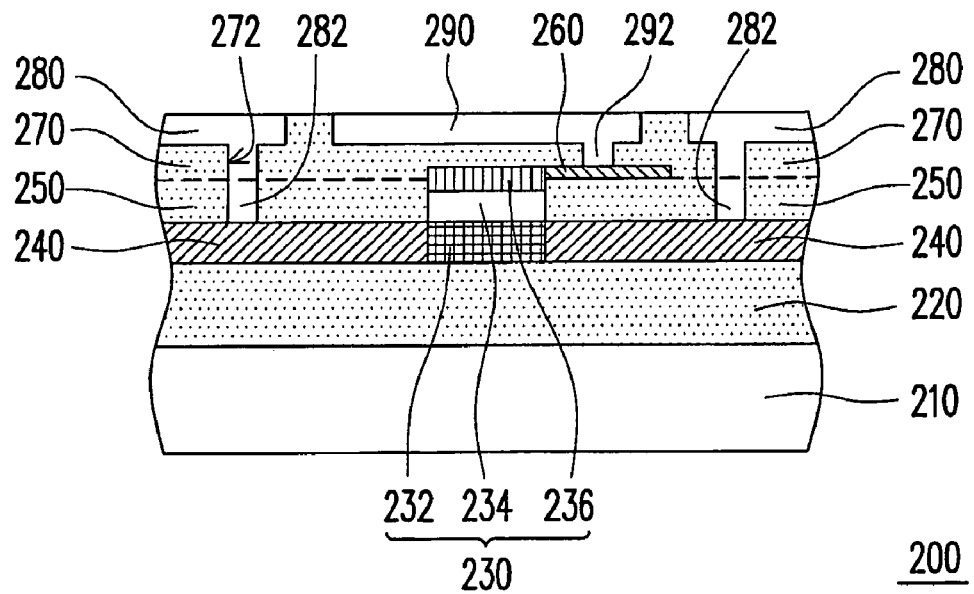

Further, referring to FIG. 2H, in the present embodiment, the method for manufacturing the electro-optical modulator further includes forming a first electrode 280, and a second electrode 290 on the third insulator layer 270. The first electrode 280 includes a plurality of first contact conductors 282 positioned in the contact windows 272. The first electrode 280 is electrically connected to the first doped semiconductor layer 240 via the first contact conductors 282. The second electrode 290 includes a plurality of second contact conductors 292 positioned in the contact windows 272. The second electrode 290 is electrically connected to the second doped semiconductor layer 260 via the second contact conductors 292. The first electrode 280 and the second electrode 290 for example can be but not restricted to be formed by a sputtering method or an evaporation method. Other methods, such as screen printing, spin coating, ink jet printing, power source processing may also be applied for forming the electrodes in other embodiments. The first electrode 280 and the second electrode 290 can be configured with a single layer or a multilayer structure, and can be made of a metal material such as gold, silver, copper, tin, lead, hafnium, tungsten, molybdenum, neodymium, titanium, tantalum, aluminum, zinc, or alloy of the foregoing, or metal oxide of the foregoing, or nitride of the foregoing, or combination of the foregoing. Till now, an electro-optical modulator 200 is obtained, as shown in FIG. 2H.

In summary, according to an electro-optical modulator of an embodiment of the present invention, because the second semiconductor layer of the optical waveguide is an intrinsic semiconductor, and the first semiconductor layer is a positive type semiconductor layer, while the third semiconductor layer is a negative type semiconductor layer, the optical waveguide is configured with a P-intrinsic-N (PIN) structure. As such, when a reverse bias is applied to the electro-optical modulator, a depletion region will directly affect a frequency response of the electro-optical modulator to simplify the frequency response condition of the electro-optical modulator. In other words, because the second semiconductor layer of the optical waveguide of the electro-optical modulator is an intrinsic semiconductor, the increased reverse bias will enlarge the depletion region, to lower down the capacitance of the optical waveguide, and accelerate the frequency response of the electro-optical modulator.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electro-optical modulator, comprising:
a substrate;
a first insulator layer, disposed on the substrate;
an optical waveguide, disposed on the first insulator layer, and adapted for transmitting a light wave, comprising a first semiconductor layer, a second semiconductor layer, and a third semiconductor layer, wherein the first semiconductor layer is disposed on the first insulator layer, the second semiconductor layer is disposed on the first semiconductor layer, and the third semiconductor layer is disposed on the second semiconductor layer;
a first doped semiconductor layer, disposed on the first insulator layer, and positioned at two opposite sides of the optical waveguide for electrically connecting the optical waveguide;
a second insulator layer, disposed on the substrate for covering the first doped semiconductor layer;
a second doped semiconductor layer, disposed on the second insulator layer, and positioned at one side of the third semiconductor layer for electrically connecting the third semiconductor layer; and a third insulator layer, disposed on the substrate for covering the second insulator layer, the optical waveguide, and the second doped semiconductor layer, wherein the second insulator layer and the third insulator layer comprise a plurality of contact windows for exposing the first doped semiconductor layer, and the second doped semiconductor layer.

2. The electro-optical modulator according to claim 1, wherein the first semiconductor layer is made of a lightly doped positive type (P⁻-type) semiconductor material.

3. The electro-optical modulator according to claim 1, wherein the second semiconductor layer is made of an intrinsic semiconductor material.

4. The electro-optical modulator according to claim 1, wherein the third semiconductor layer is made of an lightly negative type (N⁻-type) semiconductor material.

5. The electro-optical modulator according to claim 1, wherein the first doped semiconductor layer is made of a heavily doped positive type semiconductor material.

6. The electro-optical modulator according to claim 1, wherein the second doped semiconductor layer is made of a heavily doped negative type semiconductor material.

7. The electro-optical modulator according to claim 1, wherein the second doped semiconductor layer comprises a lightly doped region and a heavily doped region.

8. The electro-optical modulator according to claim 7, wherein the lightly doped region and the heavily doped region are made of negative type semiconductor material, and the lightly doped region is electrically connected to the third semiconductor layer.

9. The electro-optical modulator according to claim 1, wherein the optical waveguide has a first thickness and a first width, and the second semiconductor layer has a second thickness, which is smaller than the first thickness.

10. The electro-optical modulator according to claim 9, wherein the first thickness and the first width are substantially between 0.34 µm to 0.52 µm.

11. The electro-optical modulator according to claim 9, wherein the second thickness is substantially between 0.13 µm to 0.23 µm.

12. The electro-optical modulator according to claim 1, further comprising:

a first electrode, disposed on the third insulator layer, wherein the first electrode comprises a plurality of first contact conductors positioned in the contact windows, the first electrode is electrically connected to the first doped semiconductor via the first contact conductors; and a second electrode, disposed on the third insulator layer, wherein the second electrode comprises a plurality of second contact conductors positioned in the contact windows, the second electrode is electrically connected to the second doped semiconductor layer via the second contact conductors.

13. A method for manufacturing an electro-optical modulator, comprising:

forming a first insulator layer on a substrate;

forming an optical waveguide on the first insulator layer, wherein the optical waveguide comprises a first semiconductor layer, a second semiconductor layer, and a third semiconductor layer;

forming a first doped semiconductor layer on the first insulator layer at two opposite sides of the optical waveguide, wherein the first doped semiconductor layer is electrically connected to the optical waveguide;

forming a second insulator layer on the substrate for covering the first doped semiconductor layer;

forming a second doped semiconductor layer on the second insulator layer, wherein the second doped semiconductor layer is positioned at one side of the third semiconductor layer for electrically connecting the third semiconductor layer; and forming a third insulator layer on the substrate for covering the second insulator layer, the optical waveguide, and the second doped semiconductor layer, wherein the second insulator layer and the third insulator layer comprise a plurality of contact windows for exposing the first doped semiconductor layer, and the second doped semiconductor layer.

14. The method for manufacturing the electro-optical modulator according to claim 13, wherein the step of forming the optical waveguide further comprises the steps of:

forming the optical waveguide made of a material of the second semiconductor layer on the first insulator layer; and performing an ion doping process to the optical waveguide so as to form the first semiconductor layer and the third semiconductor layer respectively, wherein the first semiconductor layer is disposed on the first insulator layer, the second semiconductor layer is disposed on the first semiconductor layer, and the third semiconductor layer is disposed on the second semiconductor layer.

15. The method for manufacturing the electro-optical modulator according to claim 14, wherein the second semiconductor layer is made of an intrinsic semiconductor material, the first semiconductor layer is made of a lightly doped positive type semiconductor material, and the third semiconductor layer is made of a lightly doped negative type semiconductor material.

16. The method for manufacturing the electro-optical modulator according to claim 13, wherein the step of forming the first doped semiconductor layer comprises the steps of:

forming a semiconductor material layer at two opposite sides of the optical waveguide on the first insulator layer; and performing an ion doping process to the semiconductor material layer to form the first doped semiconductor layer.

17. The method for manufacturing the electro-optical modulator according to claim 16, wherein the first doped semiconductor layer is made of a heavily doped positive type semiconductor material.

18. The method for manufacturing the electro-optical modulator according to claim 13, wherein the second doped semiconductor layer is made of a heavily doped negative type semiconductor material.

19. The method for manufacturing the electro-optical modulator according to claim 13, wherein the second doped semiconductor layer comprises a lightly doped region and a heavily doped region.

20. The method for manufacturing the electro-optical modulator according to claim 19, wherein the lightly doped region and the heavily doped region are made of negative type semiconductor material, and the lightly doped region is electrically connected to the third semiconductor layer.

21. The method for manufacturing the electro-optical modulator according to claim 13, further comprising:

forming a first electrode on the third insulator layer, wherein the first electrode comprises a plurality of first contact conductors positioned in the contact windows, and the first electrode is electrically connected to the first doped semiconductor via the first contact conductors.

22. The method for manufacturing the electro-optical modulator according to claim 21, further comprising:

forming a second electrode on the third insulator layer, wherein the second electrode comprises a plurality of second contact conductors positioned in the contact windows, and the second electrode is electrically connected to the second doped semiconductor layer via the second contact conductors.

* * * * *